United States Patent [19]

Laska et al.

[11] 4,294,537
[45] Oct. 13, 1981

[54] PHOTOGRAPHIC REPRINT SYSTEM WITH INFORMATION DISPLAY

[75] Inventors: Ronald C. Laska, Minnetonka; Janis Pone, Minneapolis, both of Minn.

[73] Assignee: Pako Corporation, Minneapolis, Minn.

[21] Appl. No.: 109,825

[22] Filed: Jan. 7, 1980

Related U.S. Application Data

[63] Continuation-in-part of Ser. No. 23,521, Mar. 23, 1979, abandoned.

[51] Int. Cl.³ .................... G03B 27/72; G03B 27/76
[52] U.S. Cl. .................................. 355/35; 355/40; 355/50; 355/64; 355/88
[58] Field of Search .............. 355/5, 6, 14 R, 14 C, 355/14 CU, 18, 27, 32–38, 40, 41, 50, 51, 64, 77, 88, 97, 112

[56] References Cited

U.S. PATENT DOCUMENTS

| | | | |
|---|---|---|---|
| 3,447,871 | 6/1969 | Neale | 355/18 |
| 3,888,580 | 6/1975 | Amano et al. | 355/38 |
| 3,947,110 | 3/1976 | Yamada | 355/38 |
| 4,039,258 | 8/1977 | Hujer et al. | 355/27 |
| 4,099,862 | 7/1978 | Bickl et al. | 355/38 X |
| 4,128,330 | 12/1978 | Fergg et al. | 355/32 |
| 4,128,756 | 12/1978 | Nagano et al. | 355/14 CU X |
| 4,150,894 | 4/1979 | Meyer et al. | 355/38 |
| 4,152,068 | 5/1979 | Bickl et al. | 355/38 |

*Primary Examiner*—Richard A. Wintercorn
*Attorney, Agent, or Firm*—Kinney, Lange, Braddock, Westman and Fairbairn

[57] ABSTRACT

A photographic reprint system utilizes film segments or strips which are attached to an elongated tab. Information relating to the printing of each frame, including the desired print quantity, the color balance setup to be used in printing the frame, and exposure corrections used in printing that frame are stored sequentially in a storage medium such as a floppy disk. After the tab with attached film segments has been prepared, it is taken to a photographic printer where the tab with attached film segments is advanced sequentially and the film frames are printed. This printing is based upon information which is retrieved sequentially from the storage medium. The photographic printer includes displays for displaying the print quantity, color balance setup, and exposure corrections for each frame. In addition, the printer includes a display for displaying the order number, strip number, and frame number corresponding to the information retrieved from the storage medium. The displayed information permits the operator to monitor the operation of the printer and assists in resynchronization after a loss of synchronization has occurred.

12 Claims, 7 Drawing Figures

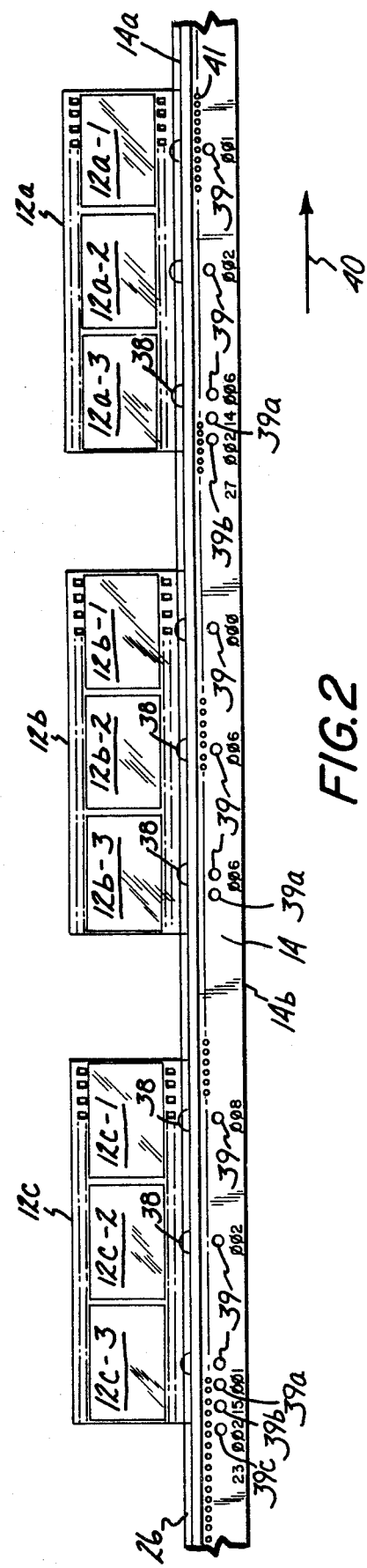
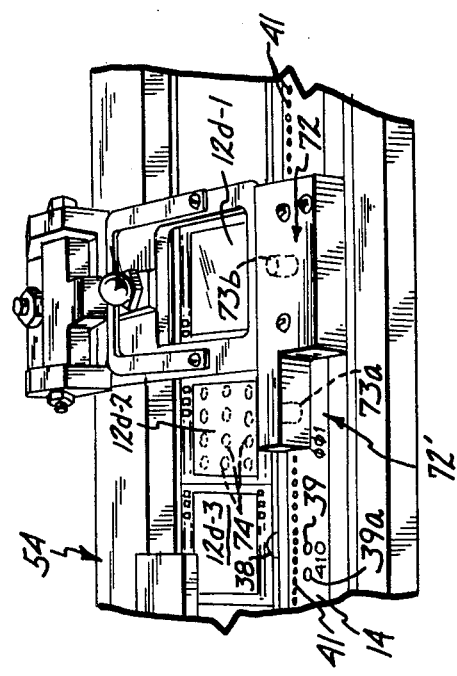
FIG. 2
FIG. 4

PHOTOGRAPHIC REPRINT SYSTEM WITH INFORMATION DISPLAY

REFERENCE TO CO-PENDING APPLICATION

The present application is a continuation-in-part of U.S. patent application Ser. No. 023,521, filed Mar. 23, 1979 by Ronald B. Harvey, Janis Pone, Ronald C. Laska, and Francis M. Laciak, now abandoned, which is assigned to the same assignee as the present application.

Reference is also made to the following U.S. patent applications, all of which are assigned to the same assignee as the present application, are filed on even date with this application, and are continuations-in-part of the above-mentioned application Ser. No. 023,521: Ser. No. 109,823, entitled "Photographic Reprint System with Dual Indicia Sensor for Synchronization Recovery;" Ser. No. 109,822, entitled "Photographic Reprint System with Reprint Neghold Indication;" Ser. No. 109,821, entitled "Photographic Reprint System with Large Print Quantity Verification;" and Ser. No. 109,824, entitled "Photographic Reprint System with Film Size Code Comparison."

BACKGROUND OF THE INVENTION

1. Field of the Invention

The present invention relates to photographic printing systems. In particular, the present invention is a photographic reprint system which includes displays which display information which assists the operator in identifying errors during operation of the printer and further assists the operator in resynchronizing the system.

2. Description of the Prior Art

In commercial photographic processing operations, very high rates of processing must be achieved and maintained in order to operate profitably. In order to permit efficient automatic processing, orders containing films of similar type and size are typically spliced together for developing. As many as 500 to 1,000 rolls of twelve, twenty, twenty-four, and thirty-six exposure film of the same type and size may be spliced together for processing and printing purposes.

After developing, the photographic images contained in the film originals (generally negatives) are printed in an edge-to-edge relationship on a continuous strip of photosensitive paper by a photographic printer. The photograhic printer causes high intensity light to be passed through the negative and imaged on the photographic print paper to expose the photographic emulsion layers of the paper. The print paper is subsequently processed to produce a print of the image contained in the negative.

This type of large-scale production is well suited to original or first-run production of photographic prints in which the film may be spliced to form a continuous roll. In the past, however, it has not been particularly well suited to production of reprints, where the customer has already received prints and has decided that he wishes to have additional prints made of certain negatives. Unlike first-run production, making of reprints has typically not been highly automated.

There are several reasons why reprints require special, less efficient handling. First, when reprints are ordered, the negatives generally have already been cut into short segments of three or four frames each, which are more difficult to handle than the longer film strips encountered in first-run production printing. Second, the customer may only desire reprints from one frame of a particular segment. This is unlike first-run production, in which a print is typically made from every printable negative on the strip. Third, often multiple prints rather than just a single print are desired from one or more negatives on a segment. Fourth, no extra non-printing area on the film is normally available to which a splice may be made. Fifth, reprints are requested from a much wider variety of film types than are typically encountered in first-run production. Sixth, color and/or density corrections may be required to produce a satisfactory print.

Because of these problems, making of reprints has often been handled on a manual or semi-automatic basis, and often on a different printer from the high speed first-run production printers, on which it may be impossible to reproduce identical print color balance and density corrections. Also dust and dirt from handling the negatives on a manual basis can degrade print quality. As a result, the quality of reprints often differs from first-run production prints. The lower quality of reprints in comparison to first-run production prints is a source of customer dissatisfaction.

In order to overcome of the problems of making reprints, and to provide more efficient automated printing of reprints, systems have been developed in which the individual segments of negatives from which reprints are to be made are temporarily attached to a long paper strip or "tab". The "tabbing" of negatives to be reprinted is performed at a "preparation" or "order entry" station, where indicia (typically in the form of punched holes) are formed in the tab adjacent the frames of the negatives. These holes are used as frame location indicators and also provide frame status information. For example, in one system the number of holes may vary from one to four, with the first hole always indicating the frame location, while multiple holes provide the frame status information to allow the printer system to maintain synchronization of reprint data with the tabbed film material. In this system, two holes at a frame signify the end of a film strip, three holes at a frame signify the end of a customer order, and four holes at a frame indicate the end of a reel. In this type of system, a data entry device and a data storage device at the preparation station are used by the operator to store for each frame the number of holes in the tab, print quantity, density/color corrections, and setup number.

In a typical automated reprint system, a photographic printer includes sensors for sensing the indicia on the paper tab in order to sense the location of each frame to be printed. The data stored in the memory device for that particular frame is transferred to the photographic printer, and the required number of reprints, if any, from that frame are then produced.

One important requirement of this type of automated reprint system is that the data which is retrieved from the memory device correspond to the frame which is printed using that data. If loss of synchronization between the film advance and the data retrieval occurs, improper quantities of prints with improper color/density corrections may be produced for all succeeding film frames. This can be extremely expensive both in terms of wasted materials and lost production time.

Another problem which can occur in this type of automated reprint system is if the data retrieved from the memory device was erroneously entered at the preparation station, or was erroneously read or retrieved. This can result in unusually large and incorrect color/density corrections being requested, improper color balance setups being requested, and improper print quantities being requested. Once again, this can lead to wasted materials and lost production time.

SUMMARY OF THE INVENTION

In the present invention, a photographic printer used for producing reprints includes displays for displaying a variety of information which assists the operator in monitoring the accuracy of the information being retrieved. The information displayed preferably includes the print quantity, color balance setup, and exposure corrections for each frame. This permits the operator to monitor the data which is being retrieved from the storage means. If, for example, an unusually large or abnormal exposure correction is requested, the operator may intervene and stop the automatic operation of the printer in order to verify that the requested corrections are appropriate.

In addition, the printer preferably includes a display for displaying the order number, strip number, and frame number corresponding to the information retrieved. This permits the operator to monitor operation to determine whether the film advance is synchronized with the data being retrieved. In addition, the displayed order number, strip number, and frame number assist the operator in resynchronizing operation of the printer in the event that a loss of synchronization between the film advance and the data retrieval has occurred.

BRIEF DESCRIPTION OF THE DRAWINGS

FIG. 2 shows a portion of a paper tab with film segments attached.

FIG. 4 is a perspective view of a portion of the neghold assembly of the photographic printer of FIG. 3.

DETAILED DESCRIPTION OF THE PREFERRED EMBODIMENTS

Figure 1:
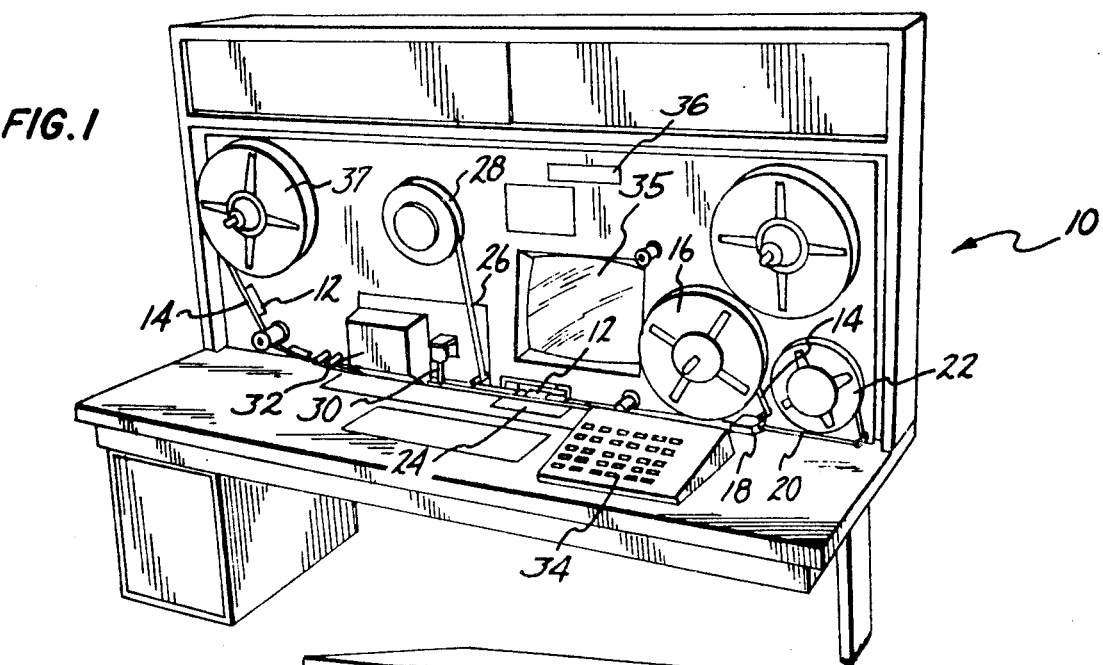
FIG. 1 is a perspective view showing the reprint film preparation station, at which strips or segments of films are attached to a paper tab, and at which data is stored relating to each frame.

FIG. 1 shows reprint film preparation station 10, at which segments or strips of photographic film 12 are attached to a paper strip or tab 14. As shown in FIG. 1, paper tab 14 is fed from reel 16 and under roller 18, where first transparent adhesive tape 20 is attached to the underside of tab 16. First tape 20 is supplied from reel 22, as shown in FIG. 1. The one edge of first tape 20 is exposed, and is used for attaching film segments 12 to paper tab 14 at mounting station 24. After film segments 12 are attached at mounting station 24, second transparent adhesive tape strip 26, which is fed from reel 28, is applied to the top surface of the junction between film segment 12 and paper tab 14. The use of first and second transparent tape strips 20 and 26 at top and bottom provides a more secure fastening of film segment 12 to paper tab 14.

After film segment 12 has been attached to paper tab 14, it advances to a marking station, at which punch holes are produced by paper punch 30. These holes are punched in paper tab 14 and indicate both the frame location and frame status information. A single hole punched in paper tab 14 indicates the location of a frame. Two holes at a frame signify both frame location and the end of a film segment. Three holes indicate a frame location, the end of a film segment, and the end of an order. Four holes indicate the location of a frame, the end of a film segment, the end of an order, and the end of the reel. Paper tab 14 and film segment 12 then advance to a paper printer 32, which prints human readable information on paper tab 14 adjacent the strip or a particular frame. In particular, paper printer 32 prints the order number adjacent the end of each order, the desired print quantity for each frame adjacent that frame, the total number of prints in each order at the end of each order, and other useful management information at the end and beginning of a reel.

Control of the operation of paper punch 30 and paper printer 32 is provided through data entry console 34. The operator of the preparation station enters, through console 34, information which is needed in the printing of prints from each frame. This information includes the end of strip, order, or reel information which determines the number of holes which should be sensed in tab 14 adjacent the frame, print quantity for that frame, and density/color correction for that frame, and the color balance setup to be used in printing reprints from that frame. The information entered through console 34 is displayed on data display 35 and is stored on a memory medium, such as a floppy disk, in controller/disk drive 36.

As shown in FIG. 1, tab 14 with attached film segments 12 is wound onto take-up reel 37. Prior to printing, tab 14 and segments 12 preferably are rewound onto a supply reel of a printer.

FIG. 2 shows an example of a portion of paper tab 14 with three film strips or segments 12a, 12b and 12c attached. Segments 12a, 12b and 12c are 135 size photographic film, and each film segment includes three frames. The three frames of segment 12a are designated 12a-1, 12a-2, and 12a-3. Similarly, the three frames of segment 12b are designated 12b-1, 12b-2, and 12b-3, and the three frames of segment 12c are designated 12c-1, 12c-2, and 12c-3.

As shown in FIG. 2, segments 12a, 12b, and 12c are attached to edge 14a of tab 14 by top layer of tape 26, and by bottom layer of tape 20 (not shown). The semicircular indexing holes or notches 38 characteristic of 135 size film are located near the edges of segments 12a, 12b and 12c which are closest to edge 14a of tab 14. Unlike first-run production printing in this particular embodiment, notches 38 do not control the positioning of the individual film frames in the print gate of the printer. Instead, frame location is indicated by holes 39 in tab 14, which are located below the center of each frame. As will be discussed in detail later, the printer has sensors which sense holes 39 in order to properly position each frame in the print gate of the printer and to count the holes for synchronization purposes.

As shown in FIG. 2 below frame 12a-3 there are three holes 39, 39a and 39b. Hole 39 indicates frame location of frame 12a-3, and the presence of a total of three holes designates that this is the end of a segment and also the end of an order. Located below frame 12b-3 are two holes 39 and 39a. Once again, hole 39 indicates frame location of frame 12b-3, while the presence of two holes (39 and 39a) indicates that this frame is the final frame of segment 12b. Located below frame 12c-3 are four holes 39, 39a, 39b and 39c. Once again, hole 39 designates the frame location of frame 12c-3, while the additional holes 39a, 39b and 39c indicate that frame 12c-3 is at the end of the reel. In other words, there are no further segments attached to tab 14.

Arrow 40 shown in FIG. 2 indicates the direction of travel of the tab 14 and attached segments 12a, 12b and 12c when placed in a photographic printer. In the preparation station shown in FIG. 1, the direction of travel of tab 14 is from right to left, rather than from left to right. As a result, when segments 12a, 12b and 12c are initially attached at film preparation station 10, edge 14b of tab 14 is furthest from the operator, and edge 14a is closest to the operator.

As shown in FIG. 2, tab 14 also includes a longitudinal row of small holes 41 which are located above frame indicating holes 39. Holes 41 are indexing holes for tab 14 as it is advanced through the preparation station. Holes 41 are not used, however, during the photographic printing operation.

As shown in FIG. 2, certain information is printed on tab 14 near edge 14b. A three digit number is printed below each frame indicating hole 39. This three digit number, which can range from "000" to "999" indicates the desired print quantity from the frame indicated by frame indicating hole 39. In the example shown in FIG. 2, the desired print quantities for frame 12a-1 is "001", the desired print quantity for frame 12a-2 is "002", and the desired print quantity for frame 12a-3 is "006".

Generally below frame 12a-3 are a five digit number "00214" and a multiple digit number "27". The five digit number indicates the order number to which the preceding film segments belong. In the example shown, segment 12a, together with at least one other segment (not shown), form order number 214. The numeral "27" indicates that there were twenty-seven total prints in order number 214. The order number and the total number of prints are only printed on tab 14 when three or more holes are present.

Frames 12b and 12c form the next order, order number 215. In the example shown, frame 12b-1 has zero prints desired, frame 12b-2 has six prints desired, and frame 12b-3 also has six prints desired. In segment 12c, frame 12c-1 has a desired print quantity of eight, frame 12c-2 has a desired print quantity of two, and frame 12c-3 has a desired print quantity of one. Printed below holes 39b and 39c are the five digit number "00215" indicating that segments 12b and 12c form order number 215. The number "23" immediately to the left of the order number indicates that there are a total of twenty-three prints desired in order number 215.

In one typical embodiment, paper printer 32 also prints a variety of useful management information at the end of the tab after end of reel indicating hole 39c. This information (not shown in FIG. 2) may include, for example, the elapsed time in preparing the reel, the film size, the printer number, the total number of orders attached, the total number of prints requested, the operator number of the operator who prepared the tab and film segments, the total number of strips or segments attached, the floppy disk number, and the date of preparation.

Figure 3:
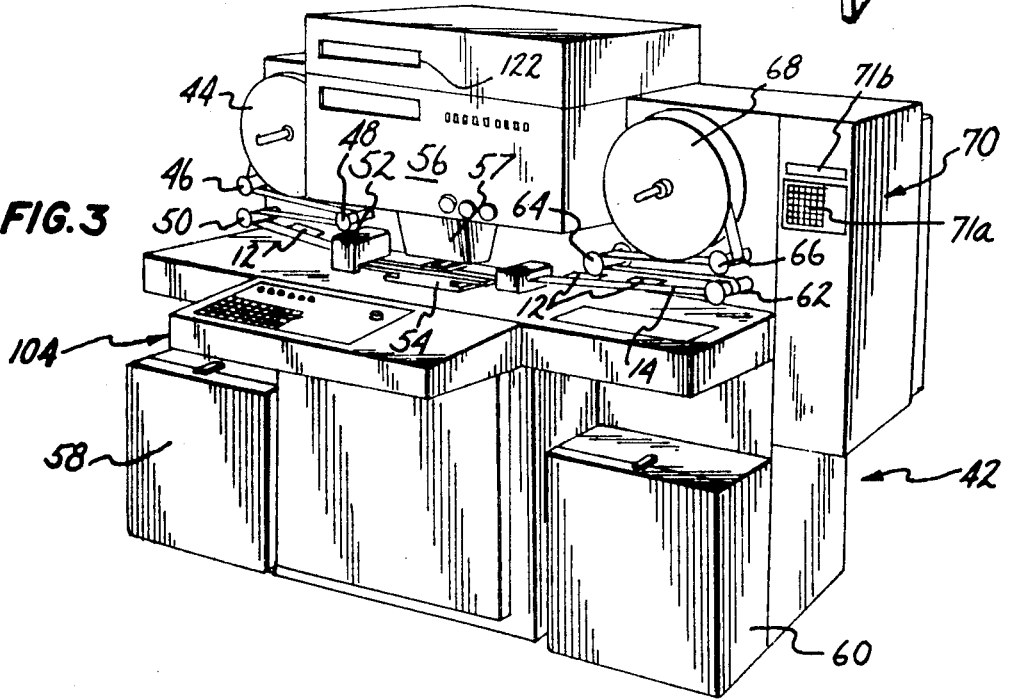
FIG. 3 is a perspective view of a photographic printer used in producing photographic reprints.

FIG. 3 shows a photographic printer 42 which utilizes the present invention in producing reprints. In the printer 42 of FIG. 3, film segments 12 and paper tab 14 are supplied from supply reel 44 over stationary roller 46, bale arm 48, and stationary roller 50 to a film cleaning station 52, where the film segments 12 are cleaned prior to printing. Film segments 12 and paper tab 14 then advance to the neghold assembly 54, at which the frames are initially previewed by light sensors to determine whether automatic exposure corrections are necessary, and then are advanced to a print gate, where light from lamp house 56 and drop cone assembly 57 is passed downward through the negative to expose photosensitive print paper (not shown) located within printer 42. In FIG. 3, print paper is fed from a light-tight supply magazine 58, into printer 42 and onto a paper deck (not shown). After exposure, the print paper is fed out of printer 42 into light-tight takeup magazine 60. After the film segments 12 and paper tab 14 have passed the neghold station 54, they are advanced over stationary roller 62 and bale arm 64 and stationary roller 66 to takeup reel 68.

In the preferred embodiment of the present invention shown in FIG. 3, floppy disk drive/controller 70 is attached to printer 42. Floppy disk drive/controller 70 reads data from the floppy disk produced at preparation station 10 during the initial tabbing of the film.

As shown in FIG. 3, floppy disk drive/controller 70 includes keyboard 71a and display 71b. The particular order and strip for which data will be retrieved from the disk may be selected by the operator by means of keyboard 71a. The ability to enter information through keyboard 71a is particularly useful in initial set-up of the system and also during resynchronization after a synchronization error has occurred. Display 71b displays the order number, strip number and frame number for the data retrieved from the disk. This displayed information is useful in identifying synchronization errors and in resynchronizing the system.

FIG. 4 shows a portion of neghold assembly 54 of printer 42. In FIG. 4 a 135-size film segment 12d has a first frame 12d-1 located at the print gate, a second frame 12d-2 located at the preview gate of the neghold assembly, and a third frame 12d-3 upstream of the preview gate. Frame 12d-1 is in position for printing. Light is passed downward through frame 12d-1 and onto the photosensitive paper (not shown) located within printer 42.

Positioned below frame 12d-2 is an array of sensors 74 which measure density of frame 12d-2 at a plurality of locations. These sensors measurements will be used in determining need for and the amount of automatic exposure corrections required when printing frame 12d-2.

FIG. 4 also shows a housing 72 containing two light sources 73a and 73b (such as lamps or light emitting diodes) which are used in the sensing of the holes in paper tab 14. Two corresponding sensors (not shown in FIG. 4 but designated "102a and 102b" in FIG. 5A) are positioned below paper tab 14, opposite light sources 73a and 73b, respectively. Sensor 102a is located adjacent the preview gate and sensor 102b is located adjacent the print gate. Sensor 102a signals the printer to take array density readings and also is utilized to count the number of holes per frame. Sensor 102b located adjacent the print gate signals the printer to stop the film feed because the frame is properly positioned at the print gate.

As shown in FIG. 4, housing 72 has a cut-away section 72' near the preview gate so that the print quantity, which is printed on the tab 14 as a three-digit number, may be viewed while the frame is at the preview gate.

In the example shown in FIG. 4, the three-digit number "001" is visible, and indicates that the desired print quantity for frame 12d-2 is one.

Frame 12d-3 in FIG. 4 is the end of the strip, and therefore two holes 39 and 39a are located adjacent frame 12d-3. Frame indication hole 39 is aligned with the center of frame 12d-3, and end-of-strip hole 39a is immediately to the left of hole 39. The desired print quantity printed on tab 14 for frame 12d-3 is "410". In other words, the desired print quantity indicated is four hundred ten prints.

Figure 5A:
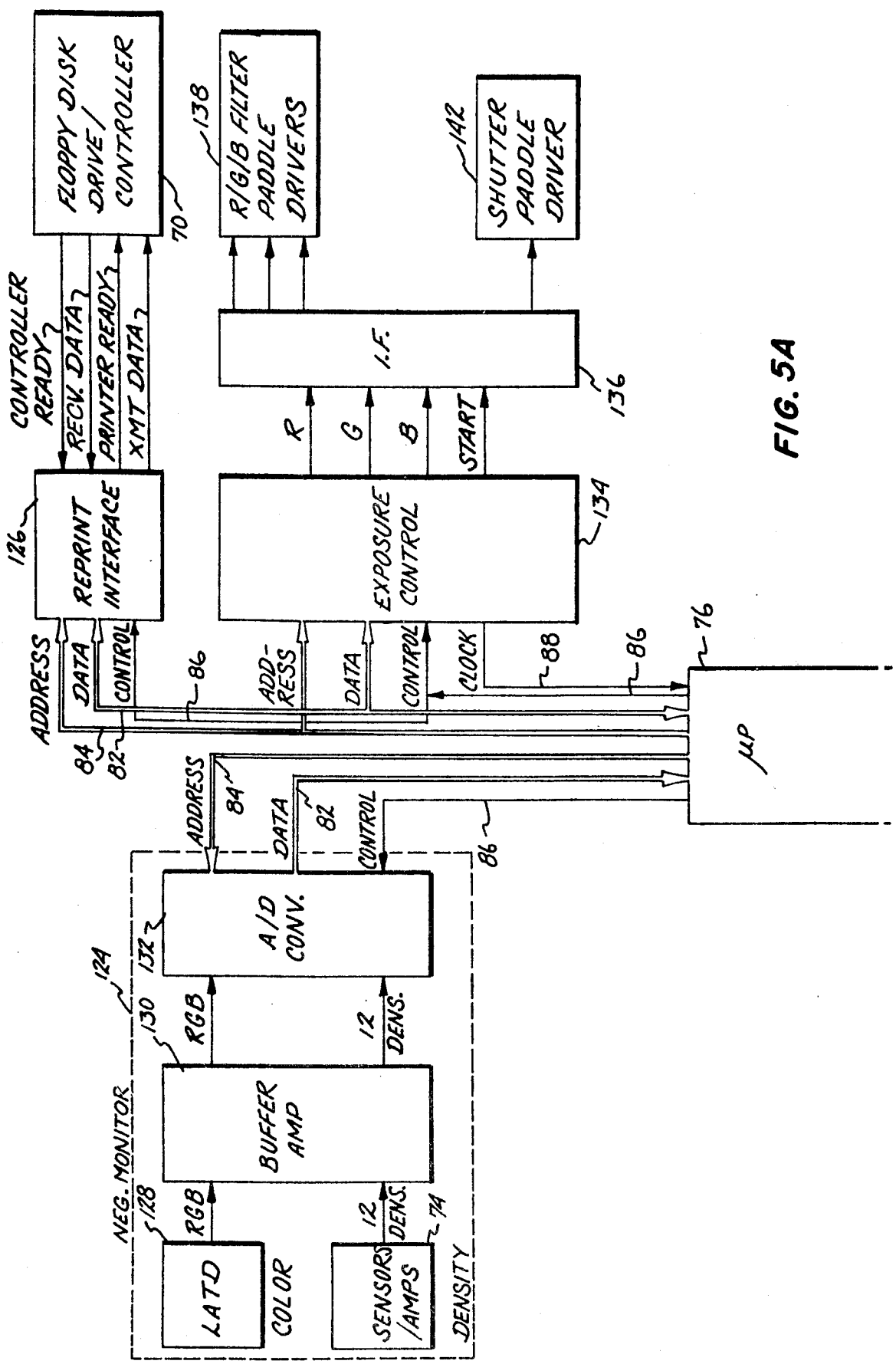
FIGS. 5A and 5B are an electrical block diagram of the photographic printer of FIG. 3.
Figure 5B:
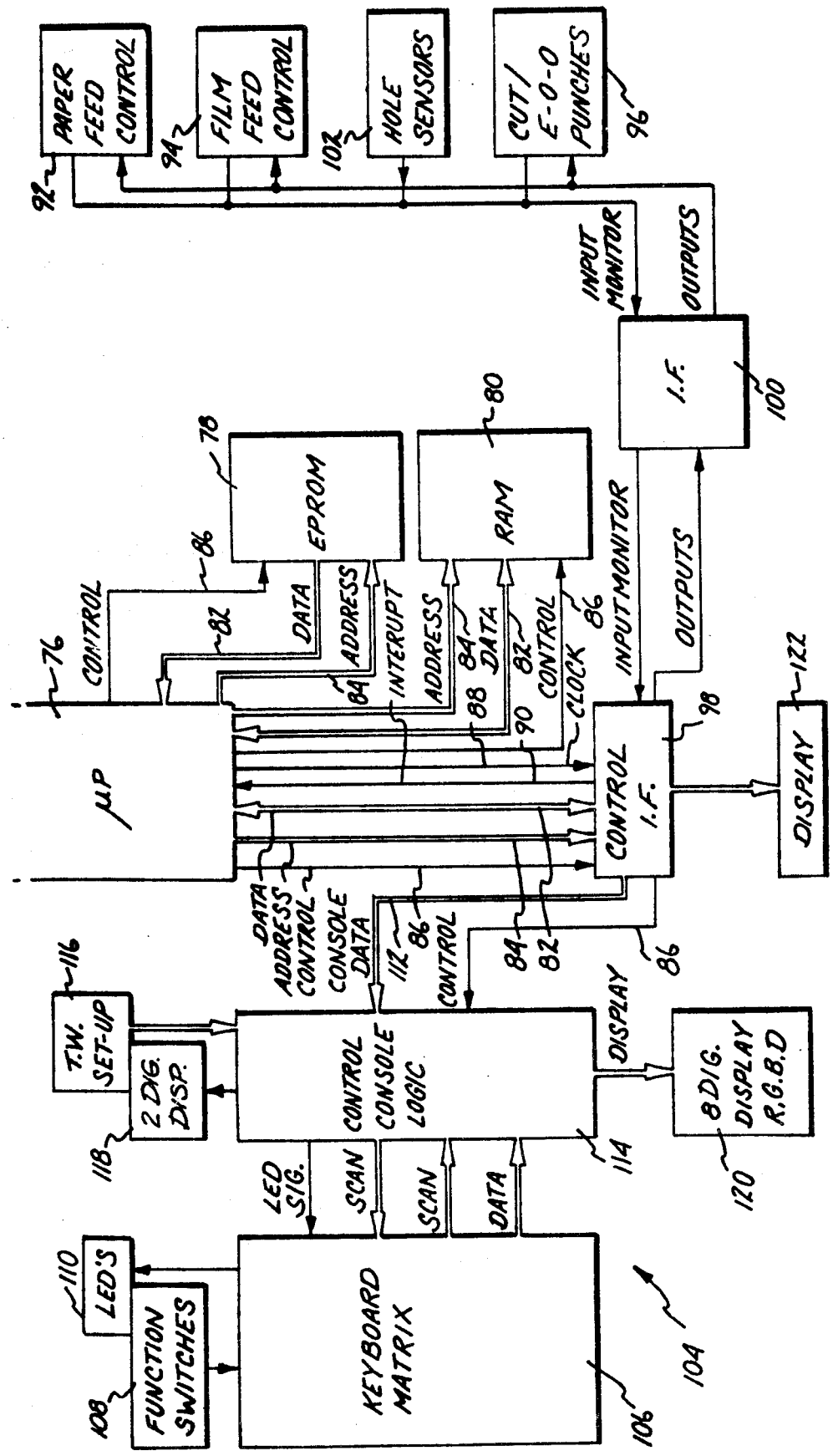

FIGS. 5A and 5B show an electrical block diagram of printer 42 shown in FIG. 3. Coordinating and controlling the operation of printer 42 is microprocessor 76, which in one preferred embodiment is an eight-bit microprocessor such as an Intel 8080A. Associated with microprocessor 76 are erasable programmable read only memory (EPROM) 78 and random access memory (RAM) 80. Microprocessor 76 communicates with the various portions of the control system through data bus 82, address bus 84, control bus 86, clock line 88, and interrupt lines 90.

In the embodiment shown in FIGS. 5A and 5B, microprocessor 76 directly controls the exposure control functions of the printer. In addition, microprocessor 76 coordinates the operation of paper feed control 92, film feed control 94, and cut/end-of-order punches 96 through control interface 98 and interface circuit 100. Input monitor signals are supplied to microprocessor 76, and output control signals are supplied to paper feed control 92, film feed control 94, and cut/end-of-order punches 96.

In the embodiments shown in FIGS. 5A and 5B, hole sensors 102a and 102b, which sense the punched holes in paper tab 14 at the preview and print gates, respectively, supply signals to microprocessor 76 through interface circuit 100, and control interface 98.

Figure 6:
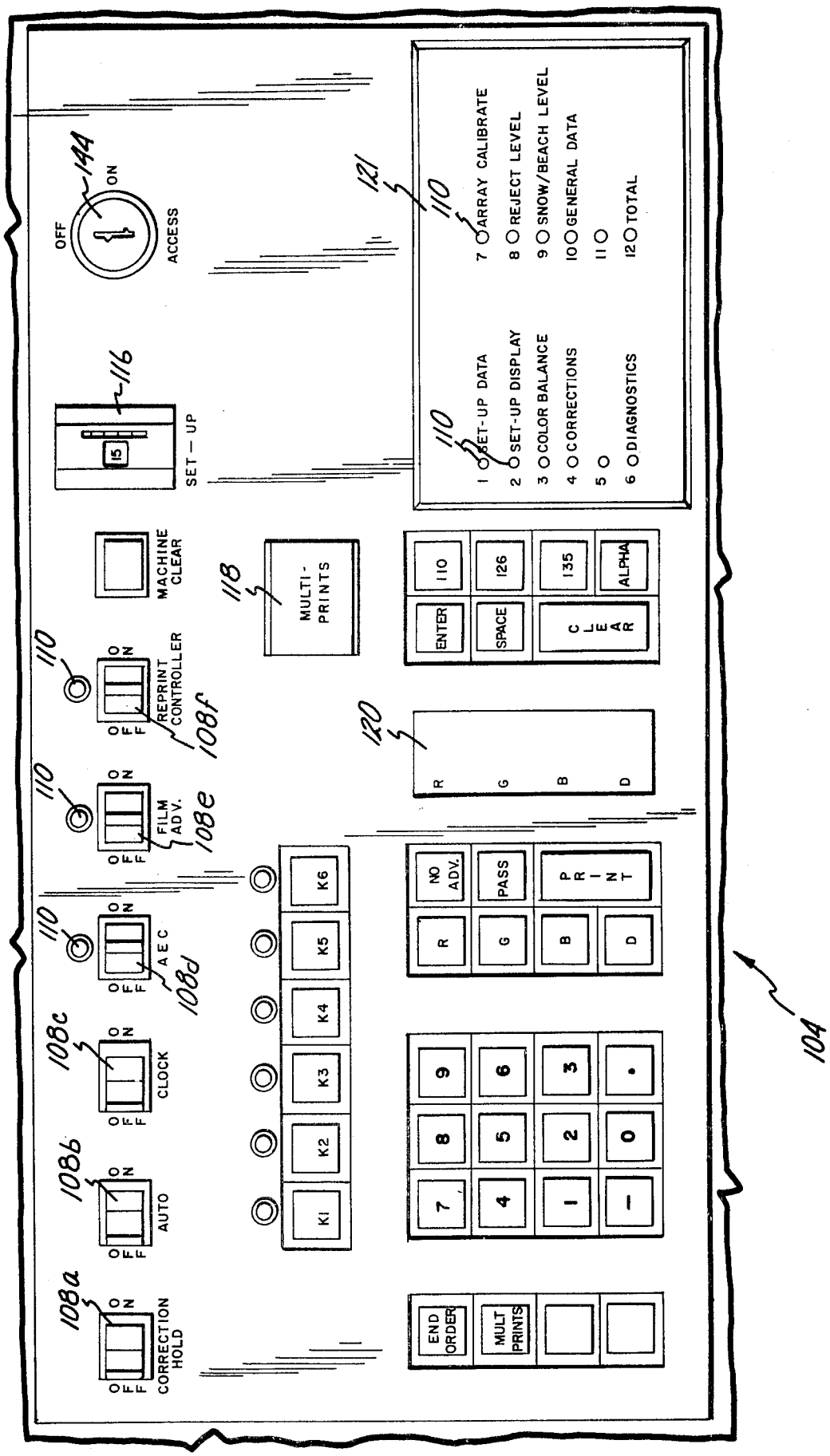
FIG. 6 is a view of the operator control panel of the photographic printer of FIG. 3.

Microprocessor 76 receives control information entered by the operator of printer 42 through control panel or console 104 (shown in FIG. 6). Console 104 includes a keyboard 106 through which the operator can enter a wide variety of alpha-numerical control information. Among the control information which is entered through keyboard 106 is red, green, blue and overall density button corrections entered by the operator. In preferred embodiments, color balance setup parameters, slope, gamma factors, and other exposure control parameters are also entered through keyboard matrix 106. As shown in FIG. 5A, function switches 108 are monitored by microprocessor 76 through keyboard matrix 106. Light emitting diodes 110 are associated with function switches 18 and keyboard matrix 106, and depending upon which function or functions are selected, microprocessor 76 energizes the appropriate light emitting diode or diodes.

Microprocessor 76 communicates with console 104 through control interface 98. Console data lines 112 and control lines 86 interconnect control interface 98 with control console logic 114. Signals to and from keyboard 106 are routed through control console logic 114. In addition to keyboard 106, control console logic 114 also is connected to setup select thumbwheel switches 116, two-digit print quantity display 118, and eight-digit color/density correction display 120. Thumbwheel switches 116 are used both in the initial storage of color balance setup data in random access memory 80, and also during normal first-run production printing to select the setup. During automatic reprint operation, the selection of setup is provided by data stored on a floppy disk which is read by floppy disk drive/controller 70.

FIG. 6 shows a preferred embodiment of control panel or console 104. Keyboard matrix 106, shown in FIG. 5A, includes the following keys which are shown in FIG. 6: "END-OF-ORDER", "MULT PRINTS", "0" through "9", "–", ".", "R", "G", "B", "D", "NO ADV" (no advance), "PASS", "PRINT", "ENTER", "SPACE", "CLEAR", "110", "126", "135", "ALPHA", "K1" through "K6", and "MACHINE CLEAR". Control console 104 also includes several function switches, including CORRECTION HOLD switch 108a, AUTO switch 108b, CLOCK switch 108c, AEC (automatic exposure correction) switch 108d, FILM ADVANCE switch 108e, and REPRINT CONTROLLER switch 108f, Key-operated ACCESS switch 108g. SETUP thumbwheel switch 116, multiple print two-print quantity display 118, and eight-digit correction display 120 are also included on console 104. Key-operated ACCESS switch 108g, which limits access to certain functions of the machine so that only the lab manager or another authorized person may alter certain critical operating parameters of the printer. Operation of ACCESS switch 108g is described in further detail in a copending patent application Ser. No. 867,897 by J. Pone, filed Jan. 9, 1978, and assigned to the same assignee as the present application.

Light emitting diodes 110 are located adjacent AEC switch 108d, FILM ADVANCE switch 108e, and REPRINT CONTROLLER switch 108f to indicate when the functions actuated by these switches are ON. Additional light emitting diodes 110 are located below a transparent function code plate 121 which has printed thereon the names of various functions or operating modes of the printer. Depending upon which function is selected, the light emitting diode 110 adjacent that function is energized, and shines through transparent plate 121.

Two-digit print quantity display 118 displays the number of prints to be made when the film frame is in the print gate. Each time an exposure cycle occurs, the print quantity being displayed is decremented until the desired print quantity has been made and the number displayed reaches zero.

Eight-digit display 120 displays the selected button corrections for red, green, blue and overall density. These button corrections either have been entered through keyboard 106 (in the case of manual operation independent of controller 70), or are the corrections retrieved by controller 70 from the floppy disk and supplied to microprocessor 76. In either case, microprocessor 76 provides the appropriate drive signals to display 120 through control interface 98 and control console logic 114. The corrections displayed on display 120 are for the frame then in the print gate.

In the embodiment shown in FIG. 5A, microprocessor 76 also controls display 122 through control interface 98. Display 122, which is also shown in FIG. 3, displays a wide variety of information of importance to the operator. For example, during initial color balancing display 122 displays instructions of the steps to be performed by the operator. In another mode, display 122 preferably displays current information as to stored parameters, and automatic corrections being used. During normal operation, in either the first run or reprint mode, display 122 displays setup number and name, or print exposure times, or error messages.

Microprocessor 76 controls print exposures based upon stored data contained in EPROM 78, RAM 80, data received from control console logic 114, and sensor signals received from negative monitor circuit 124 (FIG. 5B). In addition, when the printer is in the reprint mode of operation, additional data is received from floppy disk controller 70 through reprint interface circuit 126.

As shown in FIG. 5B, negative monitor circuitry 124 includes the density sensors 74, which provide measurement of density at a plurality of individual locations on the print. The signals from sensors 74 are produced when the negative is at the preview gate.

Negative monitor circuit 124 also includes large area transmission density (LATD) sensors 128, which provide red, green and blue LATD signals indicating the overall color content of the negative. LATD sensors 128 are located within the printer below the print gate.

Both the density signals from sensors 74 and the LATD signals from LATD sensors 128 are supplied to buffer amplifier circuit 130.

The LATD signals and the density signals are provided by buffer amplifier circuitry 130 to analog-to-digital converter 132. In a preferred embodiment, analog-to-digital converter 132 also includes multiplexers for multiplexing the twelve density sensor signals and multiplexing the three LATD signals. The signals are converted to digital signals, and are provided to microprocessor 76 over data bus 82.

Based upon the data which it receives, microprocessor 76 supplies data to exposure control 134. In one preferred embodiment, exposure control 134 is similar to the exposure control circuit shown in U.S. Pat. No. 4,140,391 by Laciak and Pone, which is assigned to the same assignee as the present application. Exposure control 134 supplies red, green and blue exposure time control signals through interface circuit 136 to red, green and blue filter paddle drivers 138. In addition, exposure control 134 supplies a start signal through interface circuit 136 to shutter paddle driver 142.

During automatic operation of the printer of the present invention, useful information is being displayed on the display 71b, of controller 70, on two-digit print quantity display 118, on eight-digit color/density correction display 120, on display 122, and by LED's 110. This information permits the operator to monitor the operation of the printer and to quickly identify potential error conditions.

For example, if extremely large color or density corrections begin to be displayed on correction display 120, the operator may choose to halt operation of the printer to verify that the corrections requested are proper. Abnormally large exposure corrections may indicate either a system malfunction by which incorrect data is being supplied to microprocessor 76 from reprint controller 70, or the incorrect entry of color/density button correction information at the preparation station. In either case, a significant waste of materials and loss of production time can be avoided if the operator monitors color/density correction display 120.

Similarly, two-digit print quantity display 118 can be monitored on a periodic basis to check against the print quantities which are printed in human-readable form on tab 14. This can be used as a spot check by the operator to assure that synchronization errors have not occurred.

In addition, display 122 displays useful information pertaining to the film originals being printed. This information includes setup number, size code, messages, and AEC corrections being applied.

Synchronization can also be monitored by the operator by reviewing display 71b, which displays the order number, strip number, and frame number for the data then being supplied by controller 70 to microprocessor 76. If synchronization between the printer and reprint controller 70 is lost, the operator may be able to identify this loss of synchronization by comparing the information displayed on display 71a with the information printed on tab 14. As shown in FIG. 2, in one embodiment paper tab 14 has the order number printed at the end of each order. From this order number the operator may count strips and frames to find the strip and frame corresponding to the strip number and frame number being displayed on display 71b. If this frame is not at the print gate, a synchronization error has occurred.

The displaying of order number, strip number and frame number is particularly advantageous when resynchronization is necessary; i.e. after a synchronization error has occurred and the printer has been stopped either automatically or by operator intervention. The operator may quickly determine which frame is then in the print gate and check display 71b to determine the frame for which data is being supplied. The operator may then physically move the tab and frame to the proper location so that they are again synchronized with reprint controller 70, or may operate the printer in a manual mode in which the printer ignores the data from controller 70 and instead is controlled by data entered by the operator through the operator control panel.

The reprint system of the present invention, therefore, has significant advantages over other automatic reprint systems. Unlike the prior art systems, the system of the present invention displays information for each frame during the operation of the printer. This permits the operator to monitor the operator of the printer and to identify error conditions before large amounts of waste materials and loss of production time have occurred.

Although the present invention has been described with reference to preferred embodiments, workers skilled in the art will recognize that changes may be made in form and detail without departing from the spirit and scope of the invention.

What is claimed is:

1. In a photographic reprint system in which photographic prints are produced from film frames of short previously-severed film strips which are connected together, the improvement comprising:
   storage means for storing information for each film frame to be printed, the information including the number of prints to be made from each film frame;
   a print gate at which light is directed through a film frame to expose a photosensitive medium and produce a print;
   means for sequentially advancing the film frames to the print gate;
   means for sequentially retrieving the stored information from the storage medium; and
   means for displaying in human readable form information retrieved from the storage means in a predetermined time relationship with respect to the sequential advancing of the film frames to the print gate and printing of the film frames; and means for displaying a human readable indication of the film frame for which information has been retrieved.

2. The invention of claim 1 wherein the stored information comprises color/density corrections to be used in printing the film frame.

3. The invention of claim 1 wherein the stored information comprises a setup number for the setup to be used in printing the film frame.

4. The invention of claim 1 wherein the stored information includes a film size code indicative of film size of the film strips.

5. The invention of claim 1 wherein the stored information includes exposure corrections to be applied in printing the film frame.

6. The invention of claim 1 wherein the displayed indication comprises an order number, a strip number, and a frame number corresponding to the information retrieved from the storage means.

7. The invention of claim 6 wherein the film strips are connected to an elongated tab, and wherein the tab includes an indication of the order number for each group of film strips comprising a customer order.

8. The invention of claim 1 wherein the means for displaying the stored information displays the information when the film frame has advanced to the print gate and during printing of the film frame at the print gate.

9. The invention of claim 8 wherein the stored information comprises the number of prints to be made from the film frame and wherein the number of prints displayed is decremented each time of the film frame is made.

10. In a photographic reprint system in which photographic prints are produced from film frames of short previously-severed film strips which are connected together, the improvement comprising:

storage means for storing information for each film frame to be printed;

a print gate at which light is directed through a film frame to expose a photosensitive medium and produce a print;

means for sequentially advancing the film frames to the print gate;

means for sequentially retrieving the stored information from the storage means;

means for controlling printing of the film frame based upon the stored information retrieved from the storage means; and means for displaying a human readable indication of the film frame for which information has been retrieved.

11. The invention of claim 10 wherein the film strips are connected to an elongated tab, and wherein the tab includes a human readable indication of an order number for each group of film strips comprising a customer order.

12. The invention of claim 11 wherein the displayed indication comprises an order number, a strip number, and a frame number corresponding to the stored information retrieved from the storage means.

* * * * *

UNITED STATES PATENT OFFICE
CERTIFICATE OF CORRECTION

Patent No. 4,294,537                    Dated October 13, 1981

Inventor(s) Ronald C. Laska and Janis Pone

It is certified that error appears in the above-identified patent and that said Letters Patent are hereby corrected as shown below:

Column 12, line 1, after "time", insert --a print-- .

Signed and Sealed this

Twenty-ninth Day of December 1981

[SEAL]

*Attest:*

GERALD J. MOSSINGHOFF

*Attesting Officer*         *Commissioner of Patents and Trademarks*